E. U. JONES.
Heel-Trimming Machines.
No. 140,420.  Patented July 1, 1873.
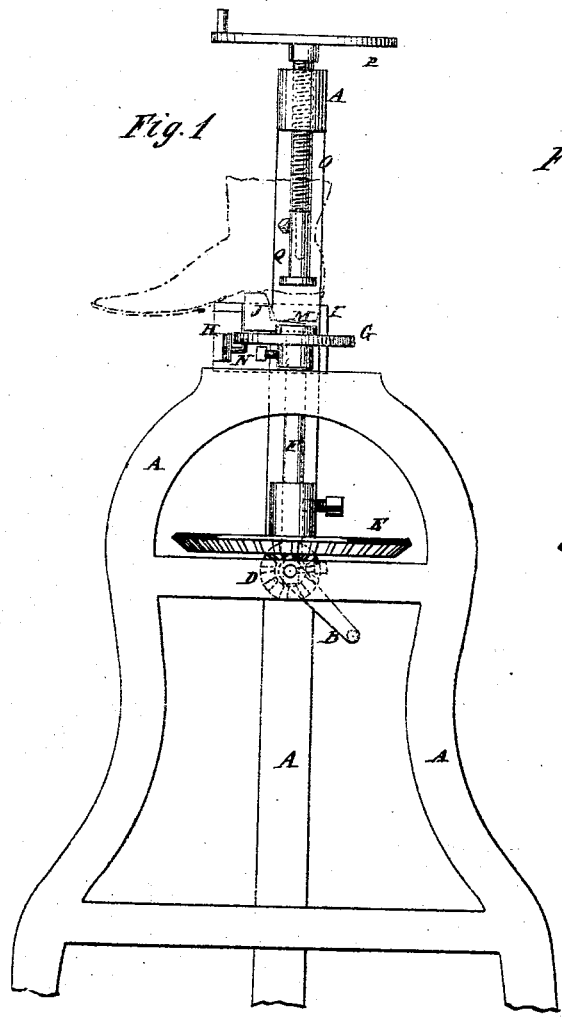
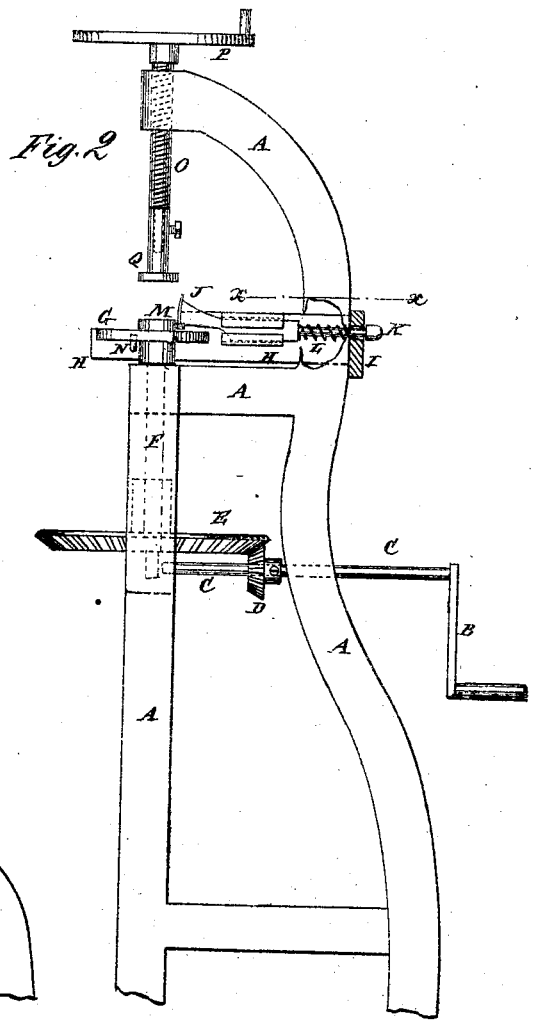
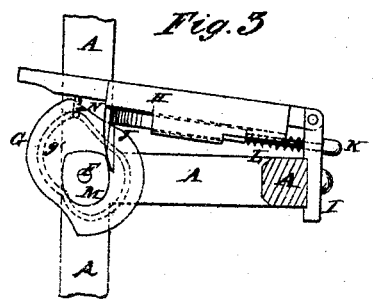
Witnesses:
Inventor:
E. U. Jones
Per
Attorneys,

UNITED STATES PATENT OFFICE.

ELISHA U. JONES, OF WOODHAVEN, NEW YORK.

IMPROVEMENT IN HEEL-TRIMMING MACHINES.

Specification forming part of Letters Patent No. 140,420, dated July 1, 1873; application filed May 17, 1873.

*To all whom it may concern:*

Be it known that I, ELISHA U. JONES, of Woodhaven, in the county of Queens and State of New York, have invented a new and useful Improvement in Shoe-Heel Trimmer, of which the following is a specification:

Figure 1 is a front view of my improved machine. Fig. 2 is a side view of the same. Fig. 3 is a detail horizontal section of the same taken through the line $x\ x$, Fig. 3. Fig. 4 is a detail under-side view of the grooved cam-plate.

My invention has for its object to furnish an improved machine for trimming shoe-heels, which shall be simple in construction, convenient in use, and effective in operation. The invention consists in the cam-plate, grooved upon its lower side, the guide-plate for the knife, the knife, the screw-rod, the spring, the hinged arm, and the hook-pin, in combination with the driving-gearing, the swiveled clutch, the hand-screw, and the frame, as hereinafter fully described.

A is the frame of the machine, which, for convenience, I prefer to make in the form shown in Figs. 1 and 2. B is the crank, by means of which motion is given to the machine, and which is attached to the shaft C, which revolves in bearings in the frame A. To the shaft C is attached a small bevel-gear wheel, D, the teeth of which mesh into the teeth of the large bevel-wheel E, attached to the vertical shaft F. To the upper end of the shaft E, which projects a little above the top of the front legs of the frame A, is attached a wheel or plate, G, the edge of which is made in the form of a double cam, as shown in Figs. 3 and 4, to allow the arm H that carries the knife to move inward at the proper times. The outer end of the arm H is pivoted to a bar or plate, I, attached to the rear part of the frame A. Upon the inner side of the arm H is formed a socket to receive the shank of the knife J, into the rear end of which shank is screwed a screw-rod, K. The screw-rod K thus limits the movement of the knife and serves as a guide-rod to hold the coiled spring L, by which the knife J is held out to its work.

The knife J is made with a finger, which projects in front of its cutting-edge and rests against the edge of the guide M, which rests upon the top of the cam-plate G, and is secured detachably to the upper end of the vertical shaft F. The guide M is made of the exact form to be given to the heel, and must be changed with every change in the form or size of the heel. To the forward end of the arm H is attached a short hook-rod, N, which enters a groove, $g'$, formed in the under side of the cam-wheel G, which groove $g'$ is so formed as to cause the knife J to move forward quickly to cut the elongated sides of the heel, and slowly while cutting the short curve of the rear part of the heel. The rear leg of the frame A projects upward and curves forward, so that its upper end may be directly over the vertical shaft F, and through it is formed a screw-hole to receive the screw O, which has a hand or crank wheel, P, attached to its upper end for convenience in operating it. To the lower end of the screw O is swiveled a clutch, Q, which is designed to rest upon and grasp the top of the last directly over the heel, so as to hold the shoe-heel firmly upon the guide-plate M while being turned and trimmed.

In using the machine, the shoe is placed upon it in the position shown in Fig. 1, and the crank B is operated to give it a half-revolution; the shoe is then removed and the revolution completed to bring the machine into position to receive another shoe.

Having thus described my invention, I claim as new and desire to secure by Letters Patent—

The cam-plate G grooved upon its lower side, the guide-plate M, the knife J, screw-rod K, spring L, hinged arm H, and hook-pin N, in combination with the gears E D, shafts C F, crank B, swiveled clutch Q, and hand-screw O, substantially as herein shown and described.

ELISHA U. JONES.

Witnesses:
JAMES T. GRAHAM,
T. B. MOSHER.